US005654891A

United States Patent [19]

Naccache et al.

[11] Patent Number: 5,654,891

[45] Date of Patent: Aug. 5, 1997

[54] METHOD AND APPARATUS FOR CONTROLLING AND/OR LIMITING SPEED EXCESS BY DRIVERS

[75] Inventors: David Naccache, Maison-Alfort; Patrice Fremanteau, Strasbourg, both of France; Wolfgang Hartnack, Burgdorf, Germany

[73] Assignee: Thomson Consumer Electronics S.A, Courbevoie, France

[21] Appl. No.: 135,491

[22] Filed: Oct. 13, 1993

[51] Int. Cl.[6] .......................... G06F 17/40; G08G 1/0967; B60K 31/00

[52] U.S. Cl. .................................... 364/438; 364/426.041; 364/565; 340/904; 340/936; 340/943; 380/23

[58] Field of Search ....................... 364/426.04, 424.021, 364/438; 340/936, 870.01; 342/464, 385, 117, 58; 346/18, 70, 33 R, 33 D; 360/5, 6, 73.01, 73.02; 74/3; 380/24, 25, 26, 28, 23

[56] References Cited

U.S. PATENT DOCUMENTS

| | | | |
|---|---|---|---|
| 3,544,958 | 12/1970 | Carey et al. | 340/38 |
| 4,072,850 | 2/1978 | McGlynn | 364/424.04 |
| 4,219,878 | 8/1980 | Goodson et al. | 364/565 |
| 4,229,727 | 10/1980 | Gilhooley | 340/53 |
| 4,591,823 | 5/1986 | Howat | 340/53 |
| 4,644,368 | 2/1987 | Mutz | 364/330 |
| 4,752,764 | 6/1988 | Peterson et al. | 340/323 R |
| 4,843,518 | 6/1989 | Wade | 364/565 |
| 4,916,296 | 4/1990 | Streck | 340/936 |
| 5,146,499 | 9/1992 | Geffrotin | 380/23 |
| 5,165,497 | 11/1992 | Chi | 364/426.04 |
| 5,189,619 | 2/1993 | Adachi et al. | 364/426.04 |
| 5,218,543 | 6/1993 | Komatsu | 364/424.04 |
| 5,305,214 | 4/1994 | Komatsu | 364/424.04 |
| 5,315,303 | 5/1994 | Tsou et al. | 342/27 |

FOREIGN PATENT DOCUMENTS

| | | |
|---|---|---|
| 2619944 | 3/1989 | France . |
| 2647930 | 12/1990 | France . |
| 2649517 | 1/1991 | France . |
| 2512976 | 10/1976 | Germany . |
| 3733582A1 | 4/1989 | Germany . |

*Primary Examiner*—Kevin J. Teska
*Assistant Examiner*—Tan Nguyen

[57] ABSTRACT

Normally, speed control is carried out by police using radar and camera. The speed of a car can also be recorded in a tachograph. According to the invention car speed is controlled and/or limited using driver-specific smart-cards and millimeter wave communications. When a car (13) enters the sector of a new transmitter (11), its card reader receives a signal telling the reader to consider the time information ($t_1$) received from the transmitter as a starting time. When the car exits this first sector and penetrates the perimeter of a second transmitter (12), the reader receives over the air a second time information ($t_2$) and other information ($v_1$, $d_1$) from which the speed is calculated and recorded within the card reader. The police can check the recorded information by inserting a special card into the reader.

14 Claims, 2 Drawing Sheets

METHOD AND APPARATUS FOR CONTROLLING AND/OR LIMITING SPEED EXCESS BY DRIVERS

The present invention relates to a method and to an apparatus for controlling and/or limiting speed excess by drivers.

BACKGROUND

Normally speed control is carried out by police using radar and camera. The speed of a car can also be recorded in a tachograph.

SUMMARY OF THE INVENTION

It is one object of the invention to provide a method of speed control which is cheap, easy to implement and assigned to the driver. This object generally is achieved by a method according to the invention.

The car speed (e.g. in cities or on highways) is controlled and/or limited using smart-cards. The invention is based on a combined use of modern smart-card identification techniques, millimeter wave communications and cryptographic computational resources. The invention allows an authority to know exactly the speed excesses committed by each driver independently of the car used to commit the offense. Driver-specific smart-cards are used so that a person may lend or rent a car to another person without being charged for speed excesses committed by the borrower. Advantageously the system is simple to implement and can be standardized easily. Usage of the car may only be enabled, if a valid card is inserted. To each driver a smart-card can be given when his driving license is delivered. Inside the smart-card's non-volatile memory, identification details of the driver such as name, date of birth, driving license number and ID (identification) number are recorded. Each car is equipped with a smart-card reader connected to a millimeter wave receiver. The millimeter wave receiver is a very cheap and simple information reception apparatus that does not require the installation of an external antenna provided that the emitter and the receiver are close enough.

The authority (e.g. police), places millimeter wave transmitters that transmit continuously data streams at sensible traffic points (e.g. along roads or highways). The transmitters are spread enough to avoid crosstalk. These data streams continuously code the time and date, limit speed value authorized in the sector and a sector-specific number.

When a driver enters a car, he has to insert his smart-card into the reader. Upon this operation, the reader puts itself in standby mode and updates a dedicated memory, e.g. an EEPROM field, by writing therein the date and time information extracted from the next encountered data stream. This time and date will be called hereafter IT (for Insertion Time). When a car enters the sector of a new transmitter, its reader receives a signal telling the reader to consider the time information $t_1$ received from the transmitter as a starting time. When the car exits this first sector and penetrates the perimeter of a second transmitter, the reader receives over the air a second time information $t_2$, an information $\{d, v\}$ and an instruction to consider $t_2$ as a stop time (t hereafter denotes the time difference $t_2-t_1$ calculated by the reader). d represents the distance between the two sectors and v the maximum speed limit value. d can also be received together with $t_1$ to indicate the location for evaluating $t_2$ after the car has done a respective distance which is controlled by the car's odometer or distance meter. A microprocessor, e.g., within the reader, computes d/t, compares this value to v and if d/t is greater than v, the reader records in its memory (EEPROM) the date, time, d/t, v, the card number and the radio transmitter's identification code. These data can also be recorded on the smart-card to allow police control after changing the car.

The speed of the car can automatically be limited in a smooth way to the allowed maximum speed, using known speed limiting methods (e.g., reduction of fuel throughput or electric energy).

If there is no card in the reader and the reader receives successively data streams from two different transmitters (someone is driving the car without a card being inserted) then the reader records a message DWC coding a "driving without a card violation", the date, time and sector numbers. If the car was not declared stolen then its owner can be fined for driving without a card being inserted.

When a police agent stops a car for a control, he introduces a control card into the reader, the reader recognizes this smart-card as being a police card and transfers to it all the data regarding speed violations committed by the various drivers who used this specific car and DWC violations committed by the owner of the vehicle as well as the last IT. When police card acknowledges the reception of the data, by the means of an adequate digital signature scheme, the reader's memory (EEPROM) is reset.

If IT seems unrealistic to the agent (just few seconds before the control) then the driver can be fined for a DWC violation. The interaction with the police card should take less then a couple of seconds so that there is no additional time lost by the driver.

The cost of the system is very low since 8 and even 4 bit microcontrollers can be easily used for implementing it efficiently.

In principle the inventive method consists in controlling and/or limiting speed excess by drivers, wherein:

millimeter wave transmitting means are placed at the limits of a geographical area where speed control is desired;

in a moving object, e.g. a car, smart-card reader means with cryptographical protection are also protected in a way that makes impossible any physical access into its electronic circuitry and in which a smart-card with driver-dependant data can be inserted;

millimeter wave receiving means in said moving object at minimum receive time and distance information within related time periods from said transmitting means;

the information received by said receiving means is evaluated in said moving object, whereby a speed value is computed from said time and distance information and in case of speed excess over a received or stored speed limit value, at minimum said calculated speed value is stored in a physically protected memory means, especially an EEPROM;

the stored speed values can be checked by an authority by inserting a control card in said card-reader or loading an information-collecting apparatus—whereby the respective content of said memory means is erased—and/or in which the speed of said moving object is automatically reduced to a preselected or received limit.

Advantageous additional embodiments and modifications of the inventive method are disclosed and defined in the respective dependent claims.

It is a further object of the invention to provide an apparatus which utilizes the inventive method. This further object is achieved according to the present invention by an apparatus which includes:

a smart-card reader with cryptographical protection and protection in such a way that makes impossible any physical access into its electronic circuitry and in which a smart-card with driver-dependant data can be inserted;

millimeter wave receiving means which at minimum receive time and distance and maximum speed value information within related time periods from millimeter wave transmitting means which are placed at the limits of a geographical area where speed control is desired;

a microprocessor receiving information from said millimeter wave receiver, exchanging information with said smart-card reader, controlling physically protected memory means—especially EEPROM—and having access to cryptographic computational resources, which computes from said time and distance information a speed value and compares it to said transmitted maximum speed value, whereby at minimum the calculated speed value is stored in said memory means if it exceeds said transmitted maximum speed value.

It is a further object of the invention to provide a method of driver-dependant speed control of a fixed maximum speed limit value. This further object is achieved, in principle by a method according to the invention for in controlling and/or limiting speed excess by drivers, wherein:

the speed of a moving object is measured within said object;

in said moving object smart-card reader means with cryptographical protection are also protected in a way that makes impossible any physical access into its electronic circuitry and in which a smart-card with driver-dependant speed limit data can be inserted;

the speed of said moving object is automatically reduced to a pre-selected driver-dependant speed value stored on said smart-card, if the measured speed exceeds said pre-selected speed value.

It is still a further object of the invention to provide an apparatus which utilizes the above inventive method of driver. This still further object is dependent speed control achieved, in principle, apparatus which includes:

a smart-card reader with cryptographical protection and protection in such a way that makes impossible any physical access into its electronic circuitry and in which a smart-card with driver-dependant data can be inserted on which a driver-dependant maximum speed limit value is stored;

a microprocessor which compares the actual speed of a car with said stored maximum speed limit value and automatically limits the speed of said car respectively by reducing the fuel throughput or the electric energy of the engine of said car.

BRIEF DESCRIPTION OF THE DRAWINGS

Preferred embodiments of the invention are described with reference to the accompanying drawings, which show in.

DETAILED DESCRIPTION OF THE PREFERRED EMBODIMENTS

Figures 1A, 1B, 1C:
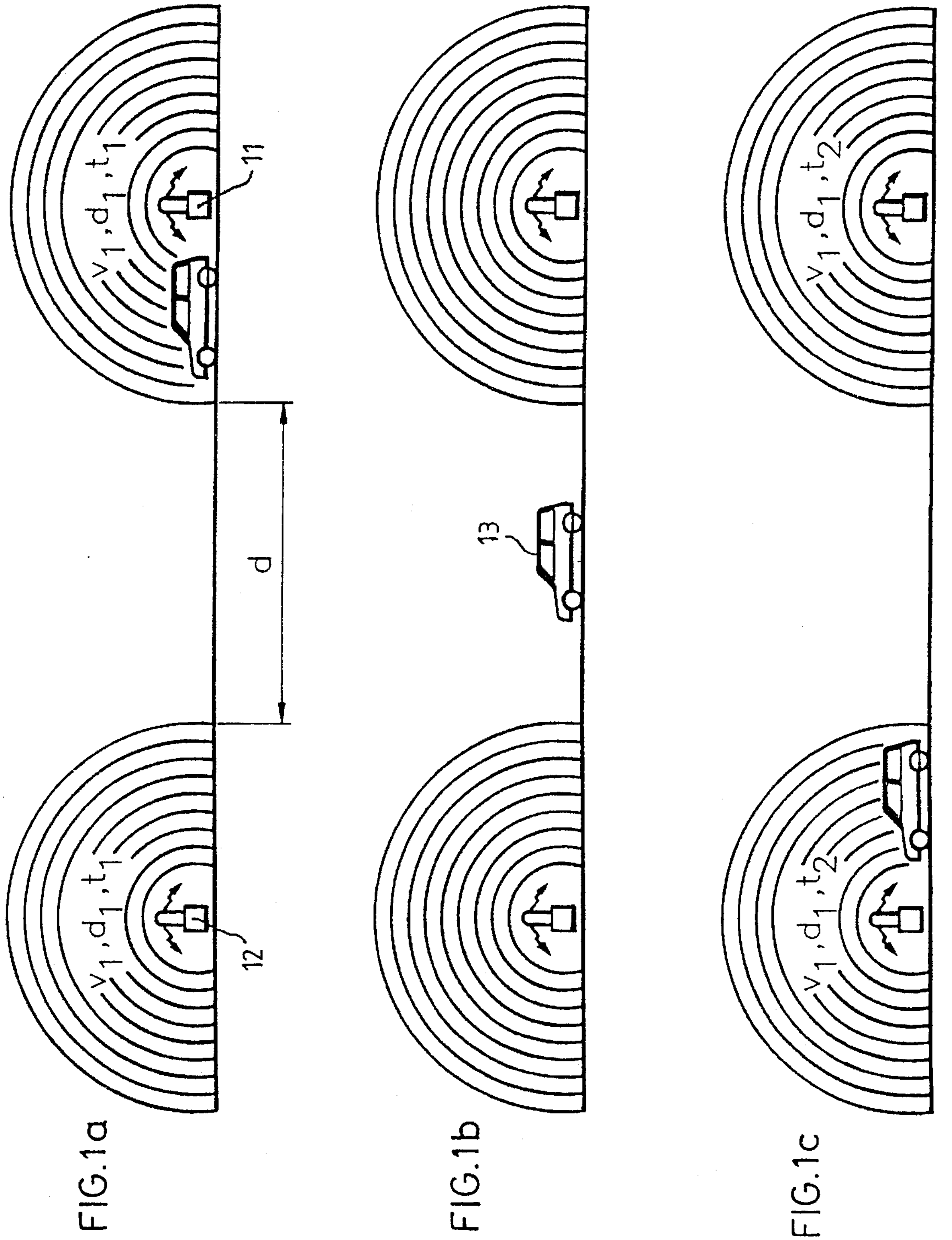
FIGS. 1a–1c illustrate the operator of the inventive method at three different tires during the travel of a vehicle

In FIGS. 1a–1c, two transmitters 11 and 12 are depicted, which transmit in FIG. 1a the data $v_1$, $d_1$ and $t_1$ and in FIG. 1c the data $v_1$, $d_1$ and $t_2$, which are received by a car 13. In FIG. 1b, the car 13 is between the two transmitters 11 and 12 and thus may not be receiving data from either transmitter. d is the distance between the receiving areas of the transmitters 11 and 12, and the subscripts indicate the respectively associated transmitted values.

Figure 2:
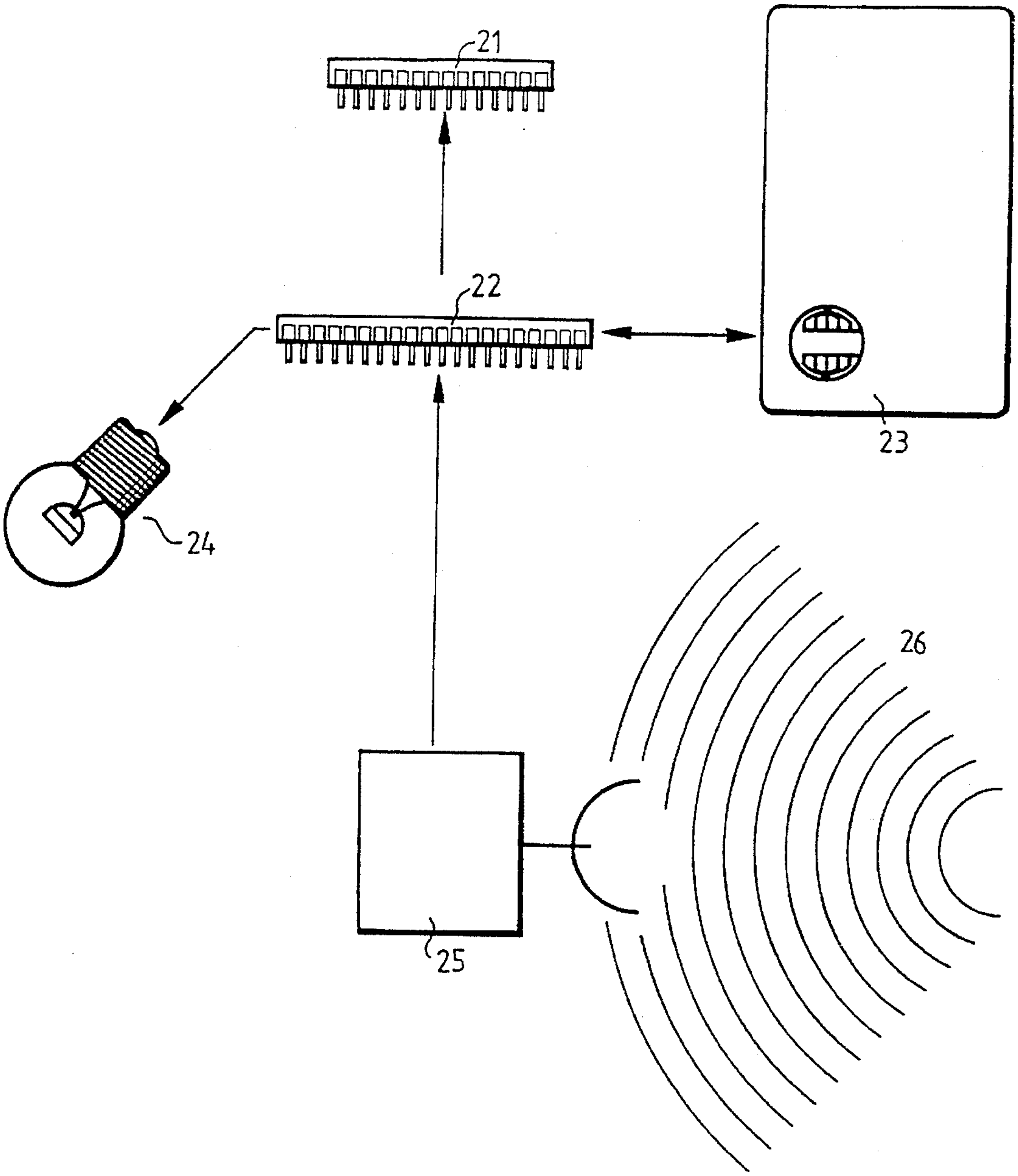
FIG. 2 is a block diagram showing the details of the inventive system.

In FIG. 2 a microprocessor 22 is connected to a millimeter wave receiver 25 receiving millimeter wave data 26, via a card reader (not depicted) to a smart-card 23 and to a memory (EEPROM) 21. The receiver 25 sends d, v, time, and/or date or geographical area data to the microprocessor, 22 which exchanges identity details with the smart-card 23 and stores law violation data in the memory 21.

The smart-card reader should be designed in such a way that external physical access to it is impossible (e.g. all the electronic circuitry is covered with strong glue). The only way to read information from the reader is via the smart-card 23 whereas inputting information into the reader is possible via the smart-card and the radio 25 receiver.

The invention can also use other frequency ranges with appropriate transmitters and receivers.

Advantageously a transmission frequency of about 60 GHz is used. Then the large $O_2$ atmospheric attenuation peak will insure that the transmission is crosstalk-free. Also 140 GHz (second atmospheric absorption peak of $O_2$) or 210 GHz or 350 GHz (first and second atmospheric absorption peaks of $H_2O$) can be used. For avoiding time losses, the police controls can be done in parallel during routine checks such as alcohol tests, border passport controls or, simply, once a year during the yearly legal mechanical checkup that cars have to undergo in certain countries.

For avoiding that drivers will cheat by disconnecting the reader from the power supply or the antenna input from the reader (or will simply put a piece of metal in front of the antenna), the police may place at random points transmitters giving to the reader the instruction to write or store a test parameter in the memory or EEPROM and then wait at a second control point, stop the car and control or determine that the reader actually received the test pattern instruction from the special transmitter.

The readers can be provided with an additional feature that will allow police agents to know if the card is in the reader and if the reader is not disconnected from the power supply and/or the antenna without stopping the car. This is achieved by means of an indicator 24, e.g. a small bulb, which is integrated in the reader in such a way that makes the bulb visible from outside the car. When the reader receives a "bulb signal", the bulb is lighted (under control of microprocessor 22) if the card is in the reader. Police agents can therefore control that the reader receives correctly the messages and that a card is inserted, by emitting such "bulb signals" and observing if the bulb is lighted for a short time while the car is moving. The apparatus may as well be integrated with millimeter wave receivers used in highway payments which are already smart-card based.

Since the readers and the smart-cards are assumed to be impossible to violate, the communications between the transmitters, readers and cards can be based on cryptographic means, e.g. symmetric encryption techniques (e.g. DES) which are very rapidly executable by electronic means.

In the invention the smart-card can also be replaced by any portable memory protected device.

The invention can also be used in connection with other kind of moving objects, e.g. trucks, trains, ships.

Instead of the transmitted maximum speed limit value v or in addition, also a fixed speed limit value can be evaluated which is stored within the card (e.g. lower speed limit for young drivers) or card reader memory.

The invention can also be used without any receiver, to limit the speed driver-dependantly as described before.

We claim:

1. Method for controlling and limiting speed excess by drivers of a moving vehicle comprising the steps of:

placing millimeter wave transmitting means at limits of a geographical area along a road where speed control is desired to transmit at least time, distance between adjacent transmitting means and associated maximum speed limit information;

providing the vehicle with a smart-card reader with cryptographical protection and with protection that makes impossible any physical access into electronic circuitry of the reader, and in which a smart-card with driver-identification data is to be inserted during operation of the vehicle;

receiving, in the moving vehicle, at least the time ($t_1$, $t_2$) and distance ($d_1$) information transmitted from the transmitting means during passage thereof by the moving vehicle;

evaluating the information received in the moving vehicle to determine a speed value from the time and distance information and, in case of a determined speed value exceeding a received speed limit value ($v_1$), storing at least the determined speed value in a physically protected memory on that vehicle and connected to the card reader;

subsequently checking the stored speed values by an authority by inserting a control card in the card-reader to read out and then erase the respective content of the memory.

2. Method according to claim 1, wherein a memory is also located within the smart-card, and further comprising additionally storing at least the determined speed value in the memory of the smart card if the received speed limit has been exceeded.

3. Method according to claim 1, wherein the data transmitted by the transmitter means includes start/stop time signals $t_1$ and $t_2$, area-related speed limit values v, the current date and time, the transmitter means identification number and the distance d between the various area transmitting means.

4. Method according to claim 3, wherein the speed value of the moving vehicle is determined by computing a speed value $d/(t_2-t_1)$.

5. Method according to claim 4, wherein the speed value $d/(t_2-t_1)$, and any of the data:

date;

time;

v;

smart-card number;

transmitting means identification code, is stored in the memory.

6. Method according to claim 1 further comprising the steps of: detecting the presence of a smart card in the card reader; and if no smart card has been inserted in the card reader of the moving vehicle while successive data streams from two different transmitting means has been received, recording a message coding non-allowed driving, the date, the time and geographical sector identifying numbers in the memory.

7. Method according to claim 1 wherein the transmitting means utilize a transmission frequency of one of about 60 GHz, 120 GHz, 210 GHz and 350 GHz.

8. Apparatus for a method according to claim 1, including:

a smart-card reader disposed on a moving vehicle, with said reader having cryptographical protection and protection such that physical access into electronic circuitry of the reader is not possible, and in which a smart-card with driver-specific data is to be inserted;

millimeter wave receiving means which are disposed in the moving vehicle and which at least receives time ($t_1$, $t_2$) and distance ($d_1$) and maximum speed value ($v_1$) information within related time periods from millimeter wave transmitting means placed at limits of a geographical area where speed control is desired; and a microprocessor disposed on the moving vehicle for receiving information from said millimeter wave receiver, exchanging information with said smart-card reader, controlling a physically protected memory, and having access to cryptographic computational resources, for computing from said time and distance information a speed value and for comparing the computed speed value to said transmitted maximum speed value and for at least storing the calculated speed value in said memory if the calculated speed value exceeds said transmitted maximum speed value.

9. Method according to claim 1, further comprising providing an indicator controlled by the card reader and which is visible from outside the moving vehicle to indicate at least that if the smart-card in the card reader is inserted.

10. Method according to claim 9, further comprising enabling the indicator from outside the moving vehicle.

11. Method according to claim 1 further comprising the steps of storing a further maximum speed value in a memory; comparing the determined speed value of the vehicle with a stored maximum speed value; and automatically reducing the speed of the moving vehicle to one of the received and stored maximum speed valves when the speed of the vehicle exceeds a respective one of said received and stored maximum speed value.

12. Method according to claim 1, wherein: the data transmitted by the transmitter means includes start time signals $t_1$, area-related speed limit values v, the current date and time, the transmitter means indentification number and the distance d for determining a time $t_2$; time $t_2$ is determined as the time required for the vehicle to move after the distance d under control of the moving vehicle's odometer; and the speed value of the moving vehicle is determined by computing a speed value $d/(t_2-t_1)$.

13. Method according to claim 1, further comprising: placing special transmitters at random points along a road, which special transmitters transmit an instruction to store a test parameter in the memory; and subsequently, at a control point, reading the memory by the authority to determine whether the test parameter has been stored and thus that the instruction to store the test pattern had received by the reader.

14. Method according to claim 1, wherein the transmitting means continuously transmits said time, distance and maximum speed limit information.

* * * * *